(12) United States Patent
Temple, Jr. et al.

(10) Patent No.: US 7,272,283 B2
(45) Date of Patent: Sep. 18, 2007

(54) DISTRIBUTION FIBER OPTIC CABLES FOR FIBER TO THE SUBSCRIBER APPLICATIONS

(75) Inventors: Kenneth D. Temple, Jr., Newton, NC (US); David L. Dean, Jr., Hickory, NC (US); Jody L. Greenwood, Hickory, NC (US); William S. Jackman, Hickory, NC (US); Keith H. Lail, Connelly Springs, NC (US); Michael deJong, Colleyville, TX (US)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 11/264,222

(22) Filed: Nov. 1, 2005

(65) Prior Publication Data

US 2007/0098342 A1 May 3, 2007

(51) Int. Cl.
*G02B 6/44* (2006.01)
(52) U.S. Cl. .................. 385/114; 385/109; 385/110; 385/112; 385/113
(58) Field of Classification Search .......... 385/112
See application file for complete search history.

(56) References Cited

U.S. PATENT DOCUMENTS

| | | | | |
|---|---|---|---|---|
| 5,177,809 A | * | 1/1993 | Zeidler | 385/105 |
| 5,218,659 A | * | 6/1993 | Schneider | 385/110 |
| 5,727,097 A | * | 3/1998 | Lee et al. | 385/58 |
| 5,838,863 A | | 11/1998 | Fujiura et al. | 385/103 |
| 5,848,212 A | * | 12/1998 | Wagman | 285/111 |
| 6,064,789 A | * | 5/2000 | Mills | 385/114 |
| 6,215,930 B1 | | 4/2001 | Estes et al. | 385/100 |
| 6,295,401 B1 | * | 9/2001 | Rutterman et al. | 385/114 |
| 6,636,673 B2 | | 10/2003 | Register, III et al. | 385/105 |

FOREIGN PATENT DOCUMENTS

| | | |
|---|---|---|
| JP | 07-218784 | 8/1995 |
| JP | 10-104441 | 4/1998 |

* cited by examiner

*Primary Examiner*—Frank Font
*Assistant Examiner*—Ryan Lepisto

(57) ABSTRACT

A fiber optic cable and methods of manufacturing the same includes at least one optical fiber, and at least one ferrule. The at least one ferrule is attached to the at least one optical fiber before the cable jacket is applied. The cable jacket surrounds the at least one optical fiber and the at least one ferrule so that when the cable jacket is opened the at least one optical fiber having the at least one ferrule attached may be accessed. Consequently, the when opening the cable, the craft is presented with an optical fiber that is preterminated with a ferrule. Optionally, the ferrule can have a cover or be a portion of a fiber optic connector. The cable is manufactured so that one or more of the ferrules are appropriately placed along the length of the fiber optic cable for distribution into the fiber optic network.

26 Claims, 9 Drawing Sheets

DISTRIBUTION FIBER OPTIC CABLES FOR FIBER TO THE SUBSCRIBER APPLICATIONS

FIELD OF THE INVENTION

The present invention relates generally to fiber optic cables that are useful for distributing optical fibers toward the subscriber such as toward the home, the business and/or the curb. In certain embodiments, the fiber optic cables of the present invention are preconnectorized making them useful as distribution cables or for other suitable applications within an optical network.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical waveguide cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the optical fiber long-haul links.

As optical waveguides are deployed deeper into communication networks, subscribers will have access to increased bandwidth. But certain obstacles exist that make it challenging and/or expensive to route optical waveguides/optical cables closer to the subscriber. For instance, making the connection between a drop cable and the distribution fiber optic cable requires a low-cost solution that is craft-friendly for installation, connectorization, and versatility. Moreover, the reliability and robustness of the fiber optic cables and the interconnection therebetween must withstand the rigors of an outdoor environment.

Conventional distribution fiber optic cables require opening by cutting or otherwise splitting the cable jacket and pulling the optical fibers through the jacket opening to access the optical fibers so they may be connectorized. However, it can be difficult to locate the correct fibers, and even when they are located, removing them from the cable without damaging the selected optical fibers or other optical fibers in the cable can be challenging. Moreover, relatively large sections of the cable jacket or more than one section of the cable jacket may require opening in order to locate and connectorize the optical fiber. Once the desired optical fibers are located and safely removed, the craftsman has to connectorize or splice the optical fibers for optical connection with the network. Conducting the conventional process with less-than-ideal conditions in the field is time-consuming, expensive, and risks damaging the cables and/or optical fibers.

SUMMARY OF THE INVENTION

To achieve these and other advantages and in accordance with the purpose of the invention as embodied and broadly described herein, one aspect of the invention is directed to a preconnectorized fiber optic cable having at least one strength member, at least one optical fiber, at least one ferrule, and a cable jacket. The ferrule is attached to the at least one optical fiber, thereby preconnectorizing the at least one optical fiber before the cable jacket is applied. Consequently, the cable jacket surrounds the at least one strength member, the at least one optical fiber and the at least one ferrule so that when the cable jacket is opened the at least one optical fiber having the at least one ferrule attached may be accessed for connecting by the craft.

In another aspect, the invention is directed to a preconnectorized fiber optic cable having a ferrule disposed radially inward of a cable jacket. The preconnectorized fiber optic cable having at least one optical fiber with the ferrule attached thereto, thereby preconnectorizing the at least one optical fiber, at least one cavity, and a cable jacket. The at least one cavity being disposed longitudinally along the preconnectorized fiber optic cable, wherein the at least one optical fiber having the ferrule attached thereto is disposed within the at least one cavity so that the cable jacket generally surrounds the at least one optical fiber having the ferrule attached thereto.

In yet another aspect, the invention is directed to a preconnectorized fiber optic cable having at least one optical fiber ribbon having a plurality of optical fibers, a cable core, a ferrule, and a cable jacket. The cable core forming a portion of at least one cavity disposed longitudinally along the cable core, wherein the cavity has a stepped profile with a wider portion radially outward of a narrower portion and the at least one optical fiber ribbon is disposed within the at least one cavity. The ferrule being attached to the at least one of the optical fibers of the at least one optical fiber ribbon and being disposed within the cavity, thereby preconnectorizing the at least one optical fiber. The cable jacket surrounds at least a portion of the cable core so that when the cable jacket is opened the ferrule having one of the optical fibers of the at least one optical fiber ribbon may be accessed.

In yet another aspect, the invention is directed to a method of manufacturing a fiber optic cable including the steps of providing a first optical fiber, providing a first ferrule, and then attaching the first ferrule to the first optical fiber before the cable jacket is applied to the preconnectorized fiber optic cable. Next, a step of placing the first ferrule at a predetermined location along a length of the cable is performed. Then the step of applying a cable jacket so that it surrounds the first ferrule attached to the first optical fiber is performed.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

DETAILED DESCRIPTION OF EXEMPLARY EMBODIMENTS

Figure 1:
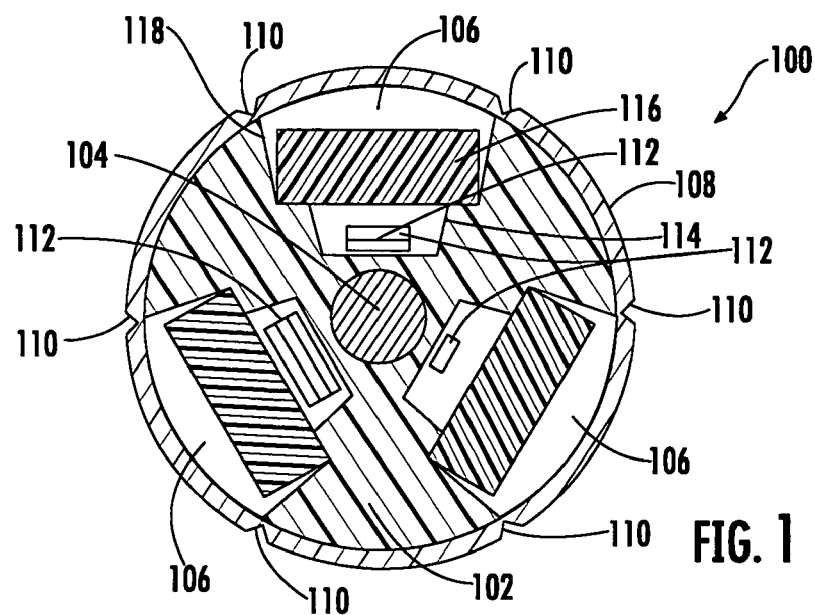
FIG. 1 is a cross-sectional view of an exemplary embodiment of a fiber optic cable according to the present invention.
Figure 2:
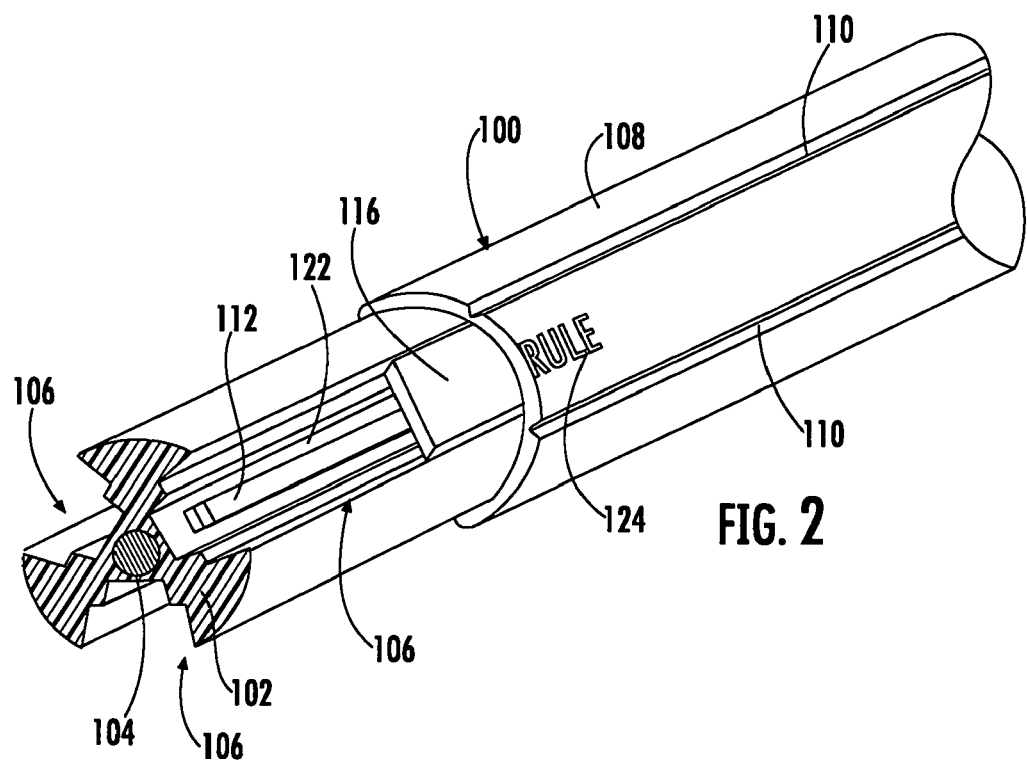
FIG. 2 is a perspective view of the fiber optic cable of FIG. 1.
Figure 3:
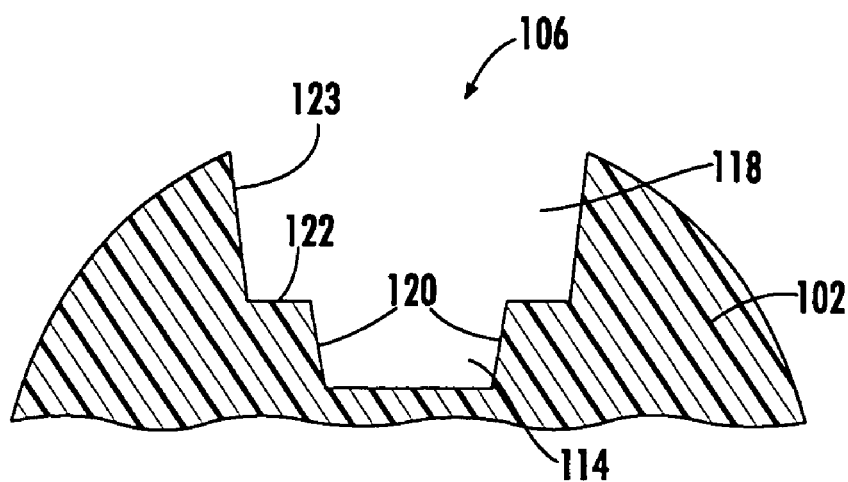
FIG. 3 is a partial cross-sectional view of a portion of the cable core of the fiber optic cable of FIG. 1.

Reference will now be made in detail to the present preferred embodiments of the invention, examples of which are illustrated in the accompanying drawings. Whenever practical, the same reference numerals are used throughout the drawings to refer to the same or like parts. One embodiment of a fiber optic cable (hereinafter cable) according to the present invention is illustrated in FIGS. 1-3 is designated generally throughout the following detailed description by the reference numeral 100. In accordance with the invention, a cable 100 is illustrated in cross section in FIG. 1. Cable 100 includes a central strength member 104, at least one optical fiber 112 (not visible as a portion of schematically illustrated ribbon), a ferrule 116 attached to the at least one optical fiber 112, thereby preconnectorizing the at least one optical fiber 112 before a cable jacket 108 is applied. In other words, cable jacket 108 surrounds the at least one strength member 104 and the at least one optical fiber 112 having the attached ferrule 116 so that when the cable jacket is opened the craft can access optical fiber that is terminated with the ferrule to streamline connectivity in the field or factory. Of course, ferrule 116 can be a portion of a fiber optic connector having a housing so that the craft can easily make optical connections. Furthermore, as discussed below, a first ferrule connected to a first optical fiber may be optically mated with a second ferrule connected to a second optical fiber, thereby creating a reconfigurable optical connection within the unbreached cable jacket for the craft. In the embodiment of FIG. 1, cable 100 is a slotted core configuration having a cable core 102 with a generally round cross-section, but the concepts of the invention can be practiced with other cable configurations.

Figure 6:
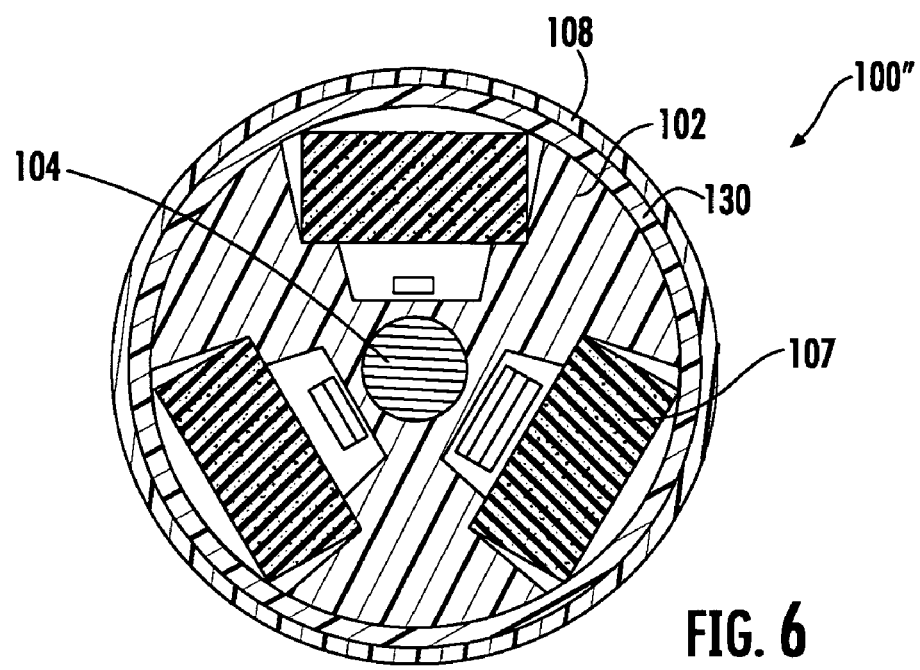
FIG. 6 is a cross-sectional view of another exemplary embodiment of a fiber optic cable according to the present invention.

Cable core 102 includes a plurality of slots (not numbered) that form a portion of a plurality of cavities 106 disposed longitudinally along the longitudinal length of the cable. In this embodiment, the slots of cable core 102 are disposed in a helical fashion, thereby imparting a non-preferential bend characteristic to the cable. Of course, slots that form a portion of cavity 106 can have other orientations such as non-stranded, an S-Z configuration, or other suitable orientations. As depicted, cable core 102 includes three slots disposed radially outward of strength member 104 that form respective portions of three cavities 106; however, any suitable number of cavities are possible. Although cable 100 includes central strength member 104 of suitable strength, the cable core 102 may act as the strength member; however, central strength member is typically stronger than the polymer that is extruded therearound to form cable core 102 having the respective slots for forming a portion of cavities 106. Cavities 106 are advantageously sized for receiving both optical fibers 112 and ferrules 116 and may have any suitable size or shape. Preferably, ferrule 116 may move within cavity 106 to inhibit the buckling or bending stress on the optical fiber(s) attached to the ferrule when, for instance, the cable is bent or coiled, but ferrule 116 may have a friction fit within cavity 106. Cavities 106 may also include other components therein such as a foam insert 107 as shown in FIG. 6 and/or a water-blocking/water-swellable component such as a water-swellable yarn or thread or a gel. In one embodiment, the foam insert also includes a water-blocking component such as a water-swellable tape laminated to the foam. Of course, the water-blocking component may be disposed within the foam.

As best shown FIGS. 1 and 2, optical fibers 112 are a portion of a fiber optic ribbon that are generally disposed within a lower portion 114 of the slots of cable core 102. Of course, the at least one optical fiber can have other configurations such as ribbons with subunits, ruggedized ribbons (i.e. a ribbon having a tight buffer layer therearound), loose fibers, fiber bundles, tight-buffered fiber, fibers in a module or other suitable arrangements. Additionally, cable designs can have any suitable fiber count and/or optical fiber arrangement depending on the application in the optical network. Ferrule 116 may be any suitable variety of ferrule known such as a single-fiber or multi-fiber ferrule. As shown, ferrules 116 of cable 100 are MT ferrules that are disposed in a plurality of upper portions 118 of the respective cavities 106. As discussed below, ferrules or connectors may have a ferrule/connector cover for protecting the ferrule and its end face from dirt, debris and physical contact until access is required so cavity 106 may be shaped to also accommodate the cover therein.

Specifically, as best illustrated FIG. 3, each slot of cable core 102 has a lower portion 114 in which the optical fibers (not shown in FIG. 3) are disposed. Lower portion 114 has walls 120 extending upward and radially outward to a ledge 122, which in turn supports the ferrules that are attached on the ends of at least some of the optical fibers. When the ferrules rest on ledge 122, the ferrules are disposed radially outward of the ledge and the optical fibers generally reside in the lower portion 114, thereby avoiding crushing forces by the ferrule onto the optical fibers. Upper portion 118 also has walls 123 extending from the ledge 122 to the outer portion of the cable core 102. Walls 123 may be taller than the height of the ferrule/connector and/or the ferrule/connector cover so that it sits below the cable core; however in other embodiments the protrusion of the ferrule may be used as indicia of its location along the cable.

Figure 3A:
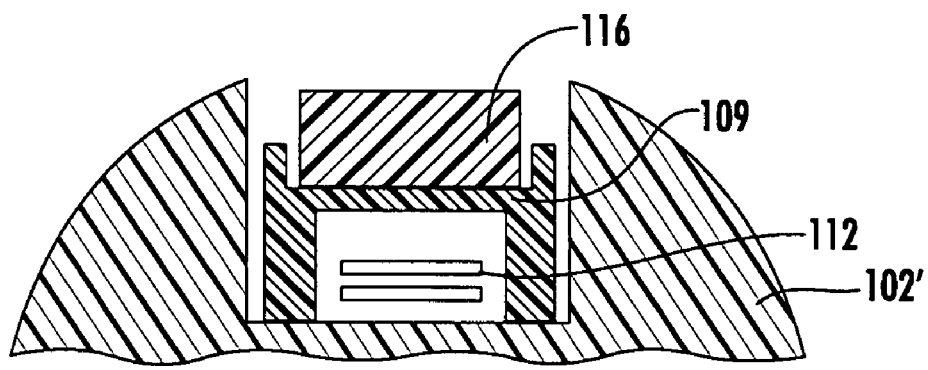
FIG. 3a is partial view of a portion of a cable core of another fiber optic cable according to the present invention.

Of course, other suitable arrangements are possible for forming the cavities that house the optical fibers/ferrules. By way of example, the slots of cable core 102 may have a constant taper in the radially outward direction or the slot can have a uniform width. Additionally, slots may have other components therein. FIG. 3a depicts a portion of a cable core 102' with a uniform width having a ferrule stand 109 therein. Ferrule stand 109 prevents ferrule 116 from moving downward into the optical fiber ribbons below, which could cause optical attenuation. Although, this embodiment shows ferrule stand 109 holding ferrule 116 below the surface of cable core 102', it could hold ferrule 116 above the surface of cable core 102', thereby forming a protrusion in the cable jacket indicating the location of ferrule 116. In other embodiments, ferrule stand 109 may be incorporated into a ferrule cover for protecting the ferrule.

Ferrules 116 in each of the cavities 106 of cable 100 may or may not be at the same position along the length of cable 100. Therefore, in order for the operator or technician to know where the ferrules are located, an indicia 124 as best shown in FIG. 2 is preferably located on cable jacket 108 to identify the location of each of the ferrules in each of the cavities 106. Likewise, indicia may also identify the particular optical fiber(s), ribbon, etc. that is terminated by the ferrule. While letters are illustrated as the indicia 124 in FIG. 2, any appropriate indicia may be used, including numbers, letters, lines, symbols, protrusions (FIG. 13), etc. By way of example, each slot may have any suitable number of optical fibers 112 in a ribbon or other format. Now focusing on the upper cavity 106 in FIG. 1, three fiber optic ribbons are located in that cavity—two in lower portion 114 and one terminated in ferrule 116. Typically, three ferrules would be used to connectorize each one of those three fiber optic ribbons; however, the ferrule may only terminate some of the optical fibers of a ribbon or the ribbons may be express ribbon that runs the length of the cable. Thus, to aid the craft indicia 124 is visible so that the craft can identify the location of the ferrules respective cavities 106.

Cable jacket 108 generally surrounds cable core 102 providing environmental protection for the cable and forms a radially outward portion of cavities 106. Simply stated, cables of the present invention have at least one ferrule attached to at least one optical fiber that are disposed radially inward of the outer surface of the cable jacket. As depicted in FIGS. 1 and 2, cable jacket 108 has preferential tear portions 110. The tear portions 110 may be portions where there is a reduced thickness in the cable jacket 108 as illustrated in the figures. It is also possible that the preferential tear portions 110 (see FIG. 2), instead of running the length of the fiber optic drop cable, are disposed only at the location of the ferrules of fiber optic drop cable 100. Other embodiments contemplated in the present invention can have other suitable means for opening the cable jacket, for instance, ripcords or the like. Additionally, cable jacket 108 may be formed of any suitable material such as a polymer and/or blends thereof. In one embodiment, cable jacket 108 is formed from a flame retardant material.

Figure 4:
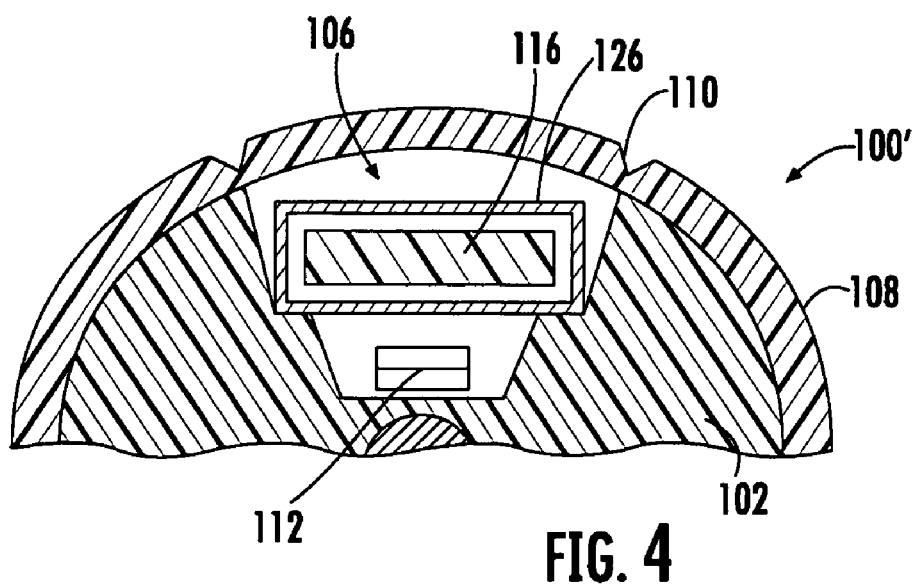
FIG. 4 is a partial cross-sectional view of another exemplary embodiment of a fiber optic cable according to the present invention.
Figure 5:
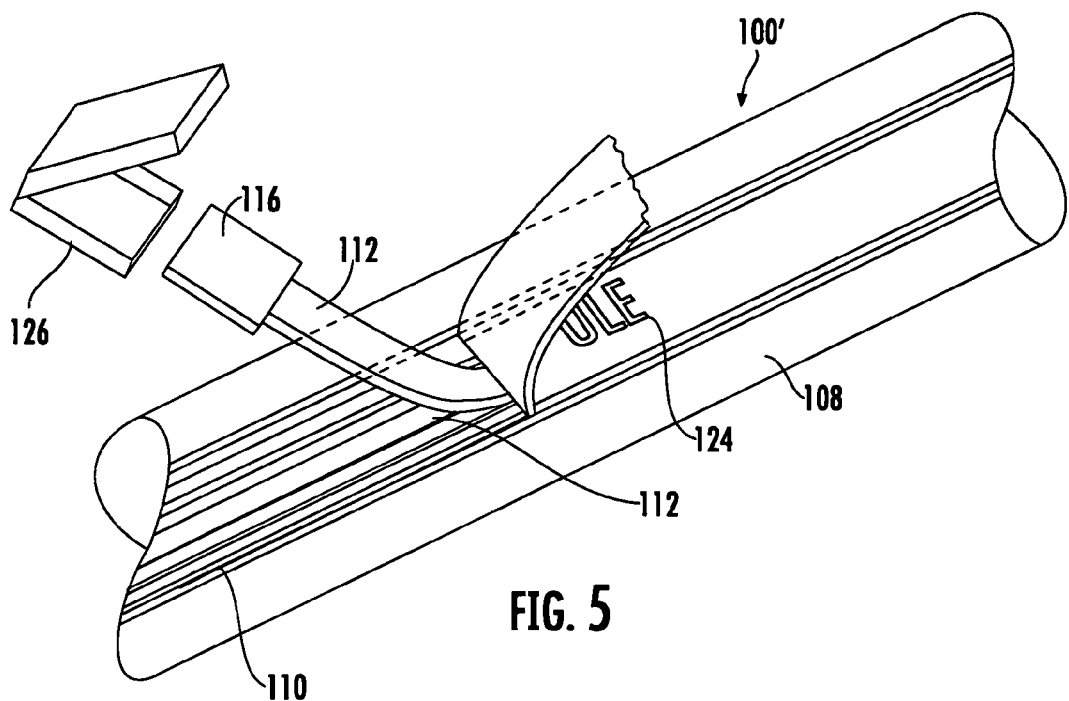
FIG. 5 is a perspective view of the fiber optic drop cable of FIG. 4 with a ferrule exiting the fiber optic cable at an access point and the cover removed from the ferrule.

FIGS. 4 and 5 illustrate another embodiment of a cable 100' according to the present invention. In this embodiment, cable 100' has ferrules/connectors 116 that each have a respective ferrule/connector cover 126 for protecting the ferrules 116 from damage, dirt, debris, and breakage during manufacturing and removal from the cable 100'. As illustrated in FIG. 5, the cable jacket 108 of cable 100' is removed at the location of the ferrule, identified by the indicia 124, and the ferrule 116 within ferrule cover 126 is exposed. The craft can then remove the covered ferrule from the slot 106 and remove the ferrule cover 126 prior to use.

Figure 5A:
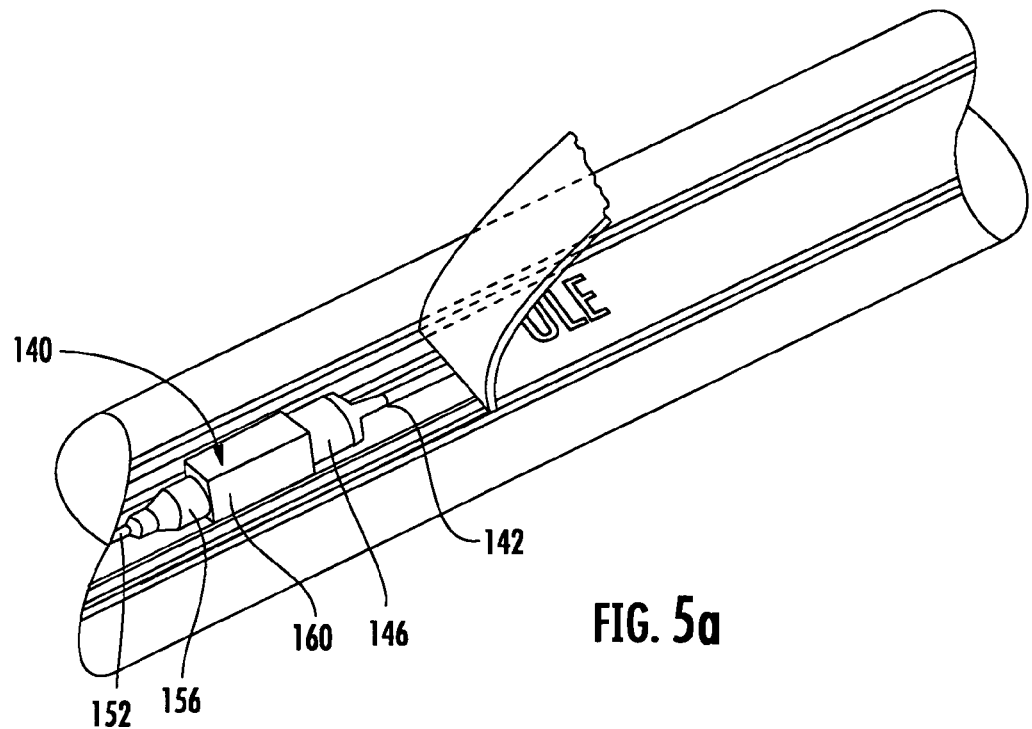
FIG. 5a is a perspective view of another fiber optic drop cable having a reconfigurable optical connection according to the present invention.

FIG. 5A depicts another embodiment of a fiber optic cable (not numbered) similar to cable 100, except it has a recogfigurable optical connection 140 disposed within the unbreached cable jacket according to the present invention. FIG. 5A depicts a breached cable jacket to illustrate reconfigurably optical connection 140 as the craft would encounter the same when opening the cable jacket. Specifically, one cavity of the cable includes a first optical fiber 142 being attached to a first ferrule (not visible) that is mated to a second ferrule (not visible) attached to a second optical fiber 152. Consequently, the first optical fiber 142 is in optical communication with the second optical fiber 152 and signals may be transferred therebetween. First ferrule and second ferrule preferably are portions of respective first and second connectors 146, 156 that are coupled together using an adapter sleeve 160. Having a reconfigurable optical connection 140 disposed within the cable is advantageous since the craft can open the cable jacket and then unplug the same to reconfigure the optical connection. For instance, the first and second optical connectors may be unplugged from the adapter and plugged into respective ports of a desired piece of communication equipment. As shown, optical fiber connectors 146, 156 are single fiber connectors such as LC connectors, but other suitable single fiber or multi-fiber connectors are possible. Although, only one reconfigurable optical connection 140 is depicted, cable may include a plurality of reconfigurable optical connections that can be staggered along a portion of a cavity or disposed in other suitable configurations within the cable.

FIG. 6 illustrates another embodiment of a cable 100". Cable 100" is similar to the previous embodiments, but with the addition of a water-swellable or water-blocking component 130 and a foam insert 107. In this cable, the water-swellable or water-blocking component 130 is water-swellable tape disposed between the cable jacket 108 and the cable core 102. In other embodiments, the water-swellable or water-blocking component can have other forms such as a grease, water-swellable yarn, or water-swellable coating disposed within the cavity. Also depicted in FIG. 6 is foam insert 107 that is disposed within one of the cavities of the cable. Foam insert 107 is preferably an open cell polyurethane foam tape for cushioning and/or inhibiting water migration along the cable that may include a water-swellable tape laminated thereto, but other suitable inserts, foam or otherwise, are possible. Although the ferrules are illustrated as not having a ferrule cover as in the previous embodiment, it is understood that a ferrule cover can be added to some, all, or none of the ferrules in cable 100".

The number of optical fibers 112 and ferrules 116 in the cable and/or each cavity 106 of cables 100,100',100" is dependent on the particular application of the cable. In order to manufacture cables according to the present invention, the ferrule of a preconnectorized optical fiber 112 (or optical fiber ribbon) is disposed, in this case, the upper portion 118 of the cavity 106 at a predetermined location (as will be understood by one of ordinary skill in the art, all of the slots 106 are preferably loaded with optical fibers in one manufacturing step, to the extent that the slots are to be used but only one will be discussed here) and the optical fibers 112 are laid into the lower portion 114 of cavity 106 along the length of the fiber optic drop cable. A second preconnectorized ribbon of optical fibers 112 is then disposed in the upper portion 118 of cavity 106 at an appropriate location along the cable and this ribbon of optical fibers 112 is laid on top of the first ribbon of optical fibers 112 along a portion of the cable. This process continues along the cable until all of the optical fibers that are needed for this particular application are installed. Thus, depending on the location along the cable, there may be more or fewer optical fibers in the cavity.

Figure 7:
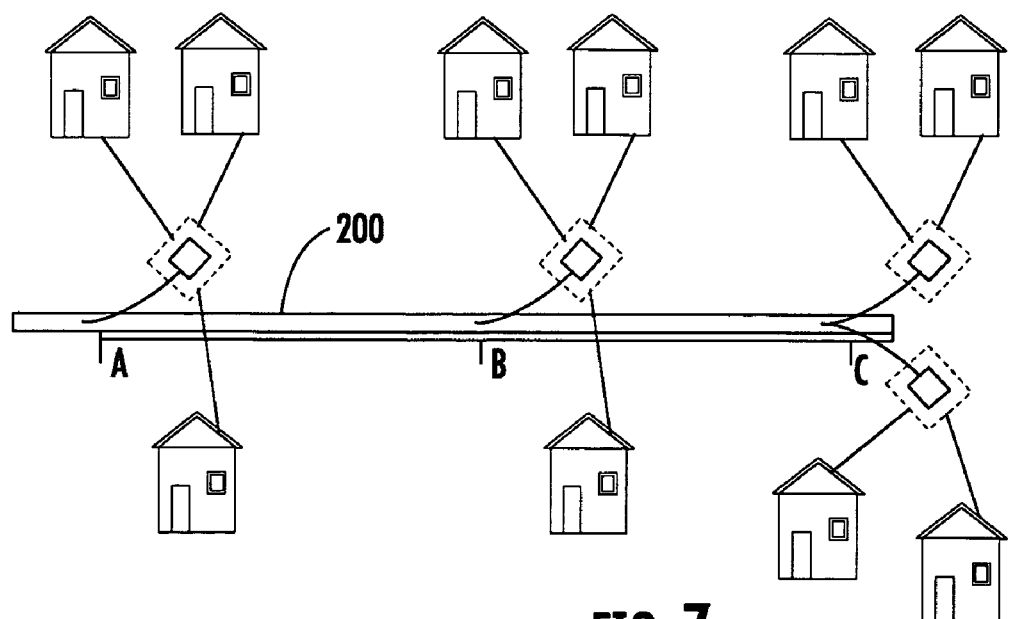
FIG. 7 is a schematic illustrating one implementation of a fiber optic cable according to the present invention.

Additionally, it is possible to manufacture a cable with a standard number of optical fibers in each of one or more cavities with the ferrules/connectors spaced at a predetermined (i.e., standard or equal) spacing to allow for generic use of the cable. This is particularly beneficial for those areas where the densities of networks are standard such as a multi-dwelling units (MDUs), etc. However, due to the costs associated with preconnectorizing optical fibers and the cost of the optical fibers themselves, the use of such standardized cables in areas where there is less planning or more variation in the locations, that type of manufacturing would be too expensive and wasteful. Therefore, it is also within the scope of the present invention, that the locations for the ferrules/connectors and the numbers of optical fibers for each cable be determined prior to manufacture of the cable, and then the cable is manufactured in accordance with the determined needs. As schematically illustrated in FIG. 7, a given area may only need three access points along a length of a cable 200 for further distribution to the subscribers. It may also be that the distance between points A and B are not the same as the distance between the points B and C. Thus, a standard cable with an equal distance between the access points would not be a satisfactory cable for use in the area illustrated in FIG. 7. A particular area may also require more or fewer access points and more or fewer optical fibers at each access point. For example, at point C in FIG. 7, two optical ribbons may be needed rather than the one needed at each of points A and B. The locations of the access points and the number of optical fibers in each cable may be determined based on the need of the particular area of installation of that cable and the cable would be manufactured based on those needs. However, it may be desirable to have spare ferrules for future access points, thereby allowing growth of the network.

Figure 8:
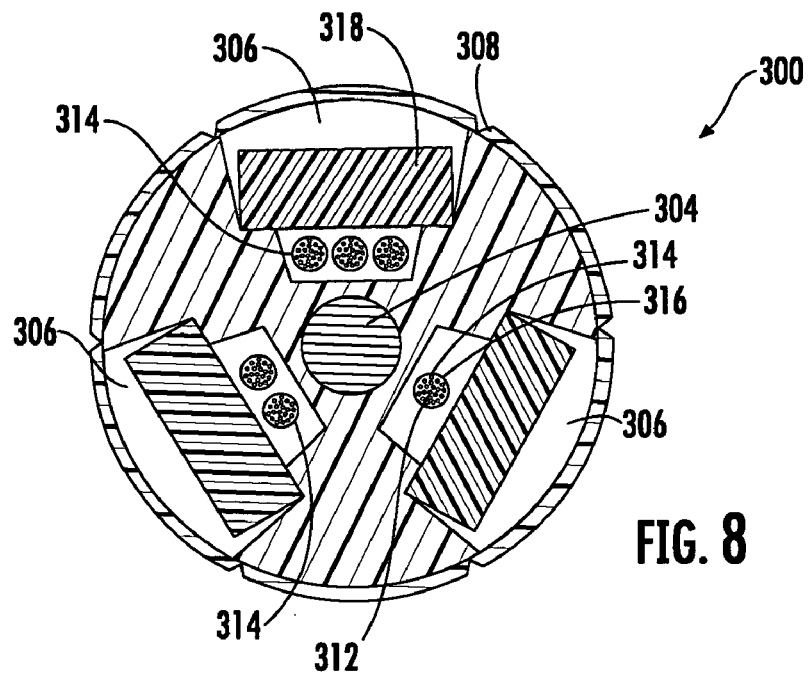
FIG. 8 is a cross-sectional view of another exemplary embodiment of a fiber optic cable according to the present invention.

FIG. 8 depicts another cable 300 according to the present invention. Cable 300 is a slotted core cable similar to cable 100 having a central strength member 304 and ferrules 318 within a plurality of cavities 306, except the plurality of cavities 306 of cable 300 have optical fibers 312 disposed within modules 314 within a cable jacket 308. Module 314 includes a module jacket 316 disposed about the optical fibers and may include other components. Modules 314 organize and protect the plurality of optical fibers 312 within each module jacket 316. Consequently, modules 314 can be routed out of the cavity of cable 300 while still having a protective covering disposed about the optical fibers. By way of example, each module 314 includes twelve colored optical fibers 312, thereby forming a relatively high optical fiber packing density. Moreover, modules 314 allow access to individual optical fibers within the module jacket 316 without having to remove the same from a ribbon matrix material. Preferably, module jacket 316 is formed from a material that is easily tearable without tools. For instance, module jacket 316 is formed from a highly filled material so that it is easily tearable by the craftsman merely using his fingers to tear the same and it will not stick to colored or tight-buffered optical fibers. Suitable module jacket materials may include a polybutylene terephthalate (PET), a polycarbonate and/or a polyethylene (PE) material having a talc and/or an ethylene vinyl acrylate (EVA); however, other suitable materials are possible such as a UV-curable acrylate. Modules 314 may include other suitable components such as a grease, water-swellable yarn, suitable thread or tape, a ripcord, or other suitable component. Additionally, the cavity of cable 300 may include a grease, water-swellable yarn or tape, and/or any other suitable component. Other embodiments may use a buffer tube instead of the module, but generally speaking the buffer tube can be stiffer and/or more difficult to remove if required.

Figure 9:
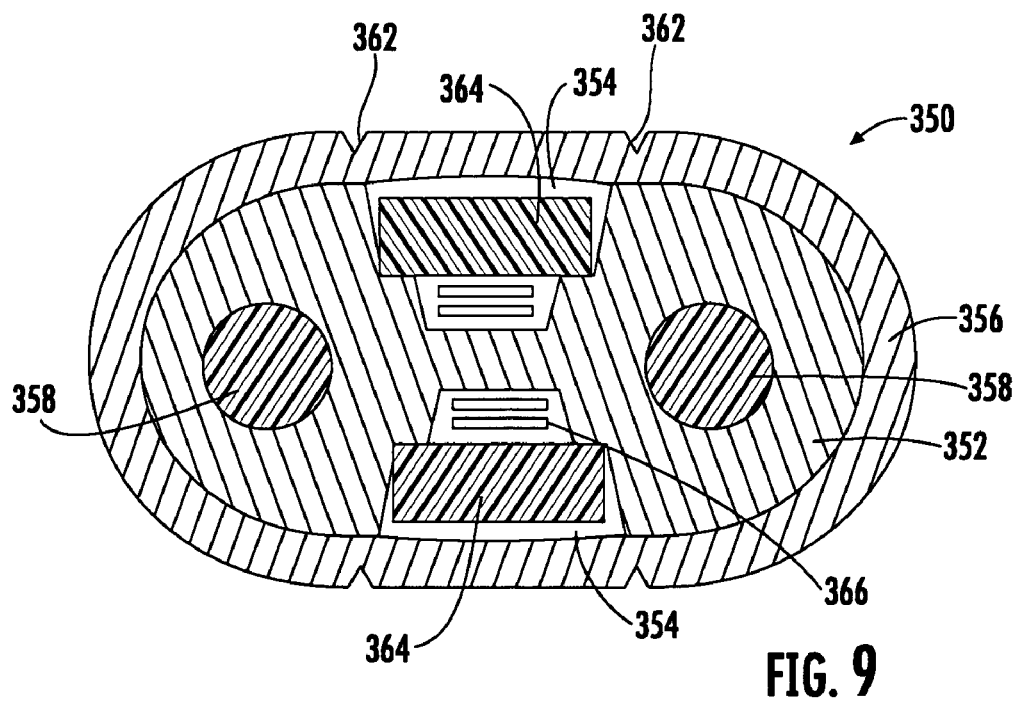
FIG. 9 is a cross-sectional view of another exemplary embodiment of a fiber optic cable according to the present invention.

Of course, other cable configurations can use the concepts of the present invention. By way of example, FIG. 9 depicts a cable 350 according to the present invention. Cable 350 is similar to the previous embodiments in that it has at least one strength member 358 at least one optical fiber 366 having at least one ferrule 364 attached thereto, thereby preconnectorizing the at least one optical fiber 366 before the cable jacket is applied. Specifically, cable 350 includes a cable jacket 356 surrounding a cable core 352 having two strength members 358 embedded therein with two slots (not numbered) that form a portion of two cavities 354 disposed longitudinally along the length of the cable for housing optical fibers 366 and ferrule 364. Strength members 358 are disposed on opposite sides of cavities 354, thereby resulting in a generally flat cross-section for cable 350. The cable jacket 356 may include preferential tear portions 362 for accessing the ferrules 364 and/or optical fibers 366, but may omit the same. In this embodiment the optical fibers 366 are illustrated as being in a ribbon configuration (which may have any appropriate number of fibers, e.g., 2, 4, 12, 24, etc.), but they may be of any configuration or format, including loose optical fibers, modules, tight buffered fibers, etc., and have any suitable number of optical fibers. Additionally, the strength members 358 can be formed from any suitable material such as conductive or dielectric material, as with the prior embodiments and/or have any suitable shape or size.

Figure 10:
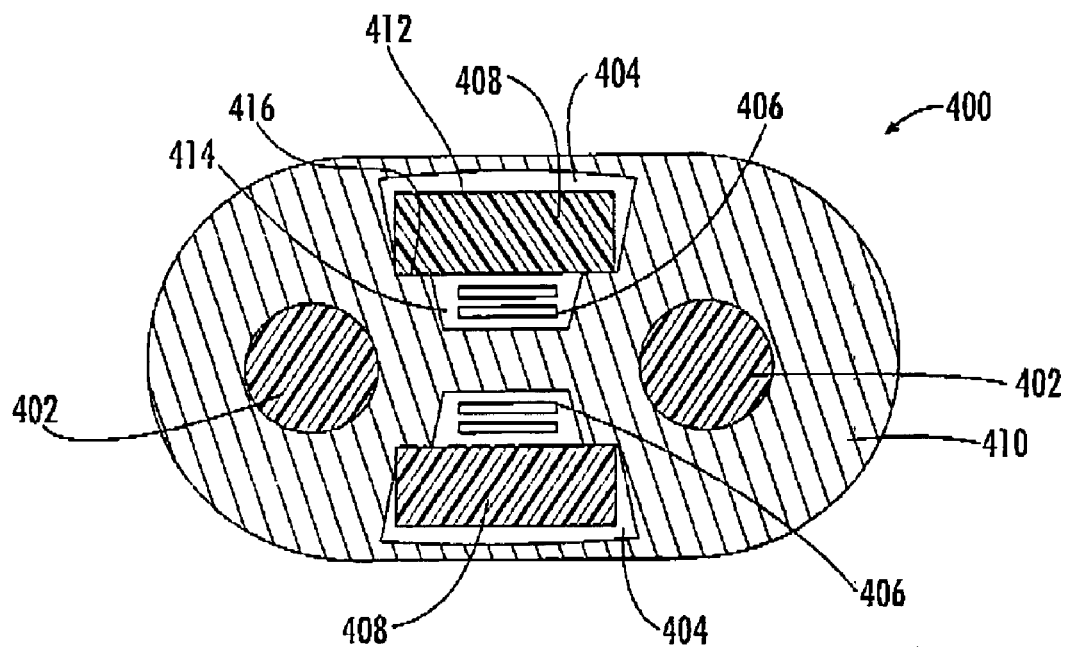
FIG. 10 is a cross-sectional view of another exemplary embodiment of a fiber optic cable according to the present invention.

FIG. 10 depicts cable 400, which is another generally flat cable embodiment according to the present invention. Cable 400 is similar to cable 350, but fiber optic cable 400 does not include the central core. Rather, cable 400 has a cable jacket 410 with two cavities 404 formed therein with two strength members 402 embedded therein. Like cable 350, cable 400 has optical fibers 406 and ferrules 408 disposed within cavities 404. Cavities 404 may provide some open space around the ferrules 408 as shown in FIG. 10, or the jacket 410 may be molded tightly around the ferrules 408 or ferrules with covers. Cavities 404 preferably have an upper portion 412 and a lower portion 414. Ferrules 408 rest on the ledge 416 of the upper portion 412 of the cavity 404 while the optical fibers are disposed in the lower portion 414. Of course, other suitable shape and/or sizes are possible for the cavities. Again, optical fibers 406 are illustrated as an optical fiber ribbon, but may have any appropriate format for the given application. Cable 400 is not illustrated as having preferential tear portions, but they may be provided along the entire length of the fiber optic drop cable 400 or only where the ferrules 408 are located along the length of the fiber optic drop cable 400 for access to the ferrules 408. Likewise, cable 400 can have other suitable structure and/or features as discussed herein.

Figure 11:
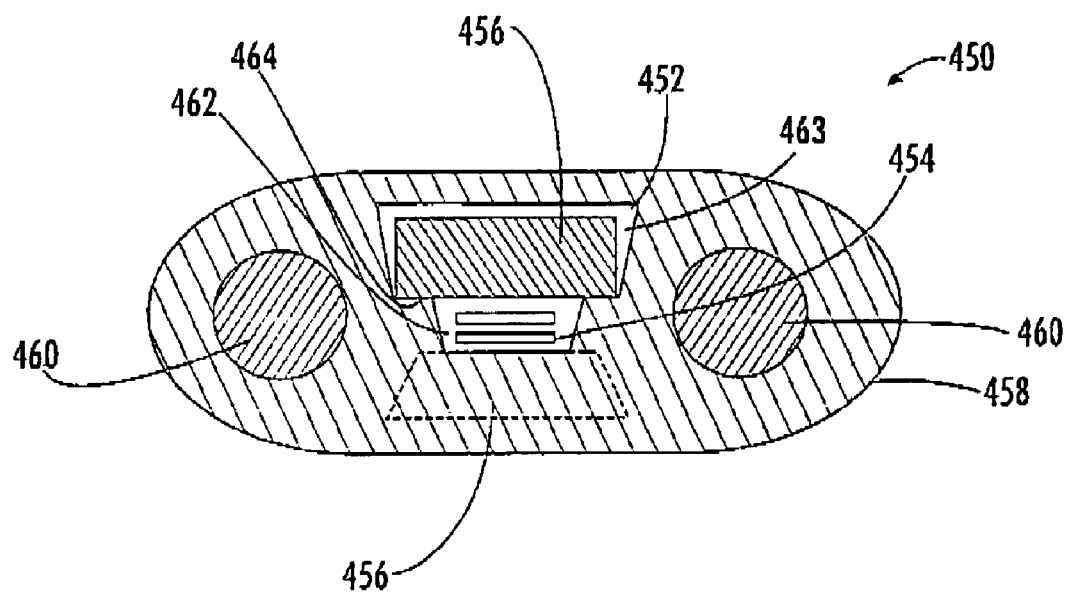
FIG. 11 is a cross-sectional view of another exemplary embodiment of a fiber optic cable according to the present invention.

FIG. 11 depicts a cable 450 according to another embodiment of the present invention. Cable 450 is similar to cable 400, but has a single cavity 452 for optical fibers 454 and ferrules 456. Cavity 452 is preferably located between two strength members 460, which may be either metallic or non-metallic, and has an upper portion 463 and a lower portion 462. The optical fibers are disposed in the lower portion 462 while one or more ferrules 456 rest on ledge 464 in the upper portion 463. In this cable, optical fibers 454 are generally disposed so they are relatively close to the neutral bending axis of the cable, this generally reduces the bending forces on same. Also, optical fibers 454 may be accessed through either side of the cable 450. In one embodiment, optical fibers 454 are ribbonized in 24 fiber optical fiber ribbons, but ribbons having other suitable fiber counts are possible along with other fiber configurations. The location of the ferrules 456 may be identified by either preferential tear portions (not shown) or by indicia (not shown) marked on the surface of the jacket 458. A variation of cable 450 is shown in phantom lines. As shown by the phantom lines, another portion of cavity 452 for holding ferrules may be located at the bottom of the cable. Thus, two ferrules can be located a single position within the cable. Additionally, this provides the cable with a generally symmetric design.

Figure 12:
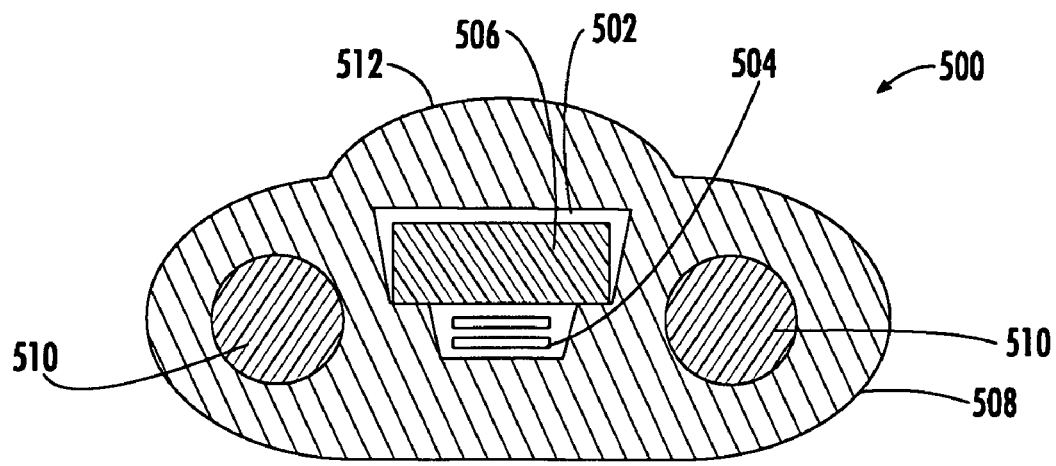
FIG. 12 is a cross-sectional view of another exemplary embodiment of a fiber optic cable according to the present invention.
Figure 13:
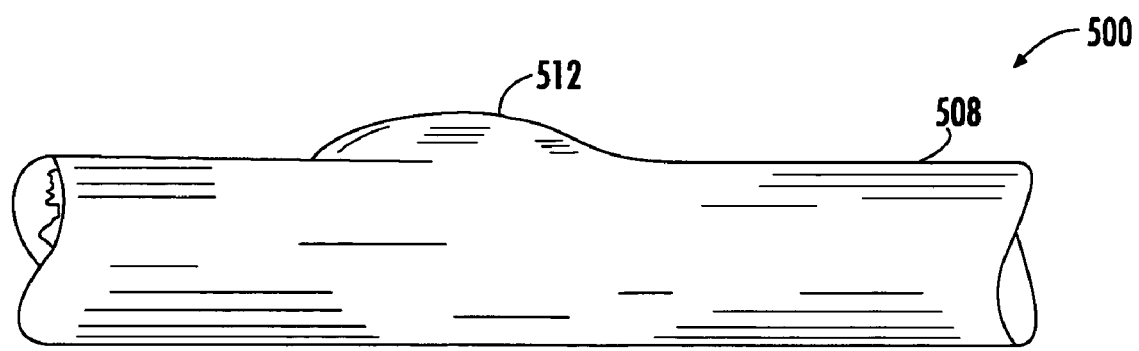
FIG. 13 is an elevational view of a portion of the fiber optic drop cable in FIG. 12.

FIGS. 12 and 13 illustrate a cable 500 according to the present invention indicating the location of the ferrules along the length of the fiber optic drop cable 500. Cable 500 is similar to cable 450 having optical fibers 504 disposed within cavity 502 with strength members 510 on either side, except the location of a ferrule 506 in the cable 500 is marked by an indicia that is a protrusion 512 of a cable jacket 508. Protrusion 512 is generally present where the ferrules 506 are located in cable 500 so that the craft can easily locate the same by sight or touch. Protrusion 512 may also be of a different color, have a marking thereon, or be otherwise highlighted for the craft.

The cables of the present invention are advantageous in several respects. First, because the ferrule is attached to the optical fiber at specific locations along the cable during the manufacturing process, the cables can be custom built for specific distribution links of the communications network or alternatively have uniform ferrule locations along the cable. Second, the ferrules may be polished before being placed within the cable in a factory environment, thereby resulting in a high-quality polished ferrule having a relatively low insertion loss compared with polishing in the field. Additionally, attaching the ferrule to the optical fiber and polishing the endface of the ferrule in the factory improves the connectivity procedure and time required by the craft by moving towards a plug and play solution. By way of example, the craft will not require: (1) expensive equipment such as a fusion splicer for splicing optical fibers together, or polishing equipment, and training for the same; (2) the arduous task of polishing the end face of the ferrule in the field; or (3) alternatively the use of mechanical splices in the field that have relatively high losses. Third, only a relatively small portion of the cable jacket must be breached such as about 5 centimeters in order to remove the ferrule from the cable. Consequently, only a small portion of the cable must be environmentally resealed, thereby resulting in a relatively small footprint on the cable about the location where the cable jacket was breached. For instance, cables of the present invention require a smaller closure or factory overmold over the breached portion of the cable jacket.

On the other hand, conventional cables require breaching a relatively large portion of the cable jacket such as about 30 centimeters that must be resealed. Breaching a relatively long section of the cable jacket is required with conventional cables so that the craft has a long enough length of optical fiber to work with when splicing or connectorizing the optical fiber. Furthermore, the conventional cables typically would fusion splice an optical fiber of the cable with an optical fiber having a connector (i.e., a fiber pigtail with a connector). Consequently, it is possible for the present invention to eliminate the fusion splice between the pigtail and optical fiber, along with the associated splice loss, by attaching the ferrule directly to the predetermined optical fiber of the cable without a fusion splice. Additionally, the protective structure for fusion splice may also be eliminated with the present invention. Of course, embodiments of the present invention may attach the ferrule to the predetermined optical fiber of the cable by splicing an optical fiber pigtail thereto if desired.

Figure 14:
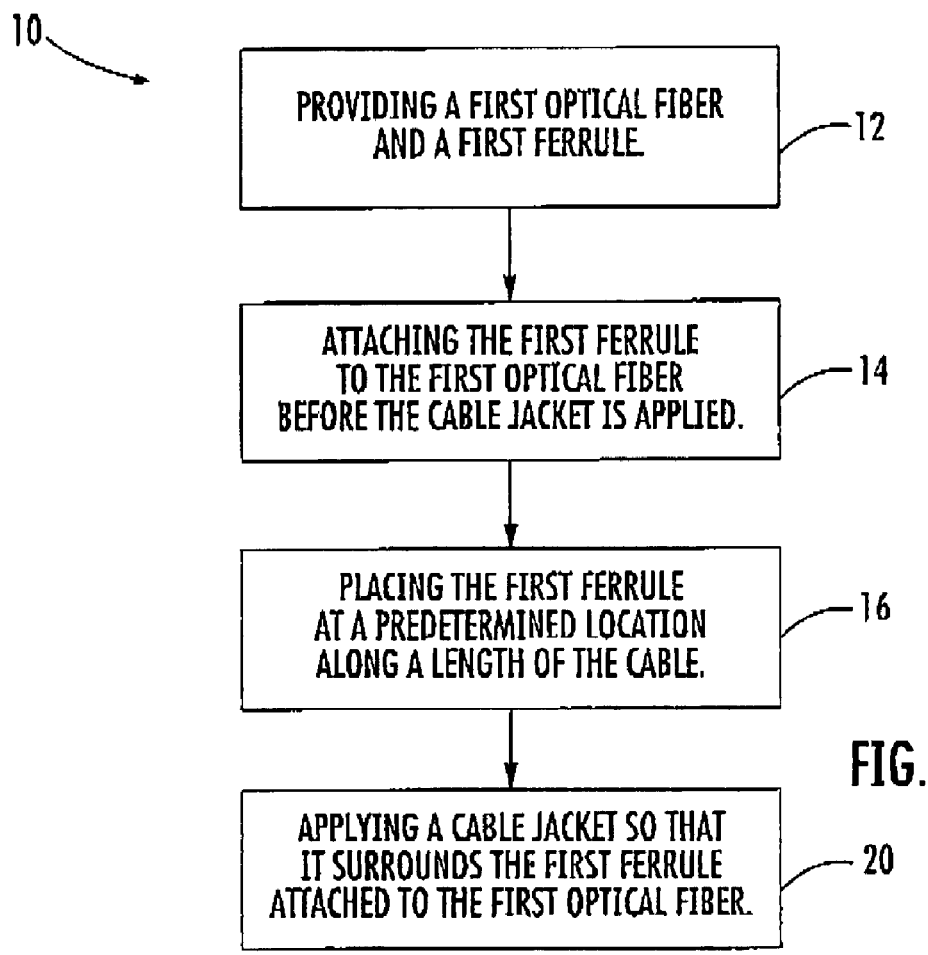
FIG. 14 is a flowchart depicting a method of manufacturing a cable according to the present invention.

The present invention is also directed to a method of manufacturing a preconnectorized fiber optic cable or a reconfigurable cable. FIG. 14 depicts a flowchart 10 showing the steps of manufacturing a cable according to the present invention. First, a step 12 is providing a first optical fiber and a first ferrule. Next, a step 14 is attaching the first ferrule to the first optical fiber before the cable jacket is applied to the cable. Attaching the first ferrule to the first optical fiber also includes a process where an optical fiber is spliced to the pigtail having a ferrule. In other words, instead of attaching the first ferrule directly to the optical fiber, the splicing of the pigtail attaches the first ferrule with the first optical fiber of the cable. At this point, optional manufacturing steps are possible such as polishing the endface of the ferrule, applying a cover over the ferrule, and/or making the ferrule a portion of a fiber optic connector. Additionally, these optional steps can have a different manufacturing order, for instance, in a cable using a pigtail the ferrule may be polished before being attached (i.e. spliced) to the first optical fiber. Thereafter, a step 16 is placing the first ferrule at a predetermined location along a length of the cable. Placing the ferrule with the attached optical fiber within the cable may vary depending on the type of cable being manufactured, the equipment used, and the like. For instance, in the manufacturing of cable 100 the first ferrule is placed into the desired slot of cable core 102 and then the attached optical fibers are placed into the desired slot along the desired length of the cable as known in the art. Likewise, a similar process may be used with other ferrules in the same slot or in different slots of the cable core. On the other hand, manufacturing of cable 450 requires placing the first ferrule within the cable by feeding the same into the extrusion tooling at the appropriate position along the cable on the jacketing line. Whatever, cable specific manufacturing steps are performed, a step 20 of applying a cable jacket so that it surrounds the first ferrule attached to the first optical fiber is preformed, thereby forming the preconnectorized cable. The cable jacket is preferably extruded, but other manufacturing techniques are possible.

Likewise, the reconfigurable cables of the present invention are manufactured by attaching a first ferrule to the first optical fiber; then, a second ferrule is attached to a second optical fiber that continues within the cable. Thereafter, the first and second ferrules are mated together for transmitting optical signals between the first and second optical fibers. By way of example, the first and second ferrules are assembled as respective portions of a first connector and a second connector and are mated together using a suitable adapter, thereby forming a reconfigurable optical connection within the cable. Then, like the preconnectorized optical fiber cable, the reconfigurable optical connection is placed at a suitable position within the cable and thereafter a cable jacket is applied thereover, thereby providing the reconfigurable optical connection. Of course, the first and second ferrules of the reconfigurable optical connection may be attached by splicing suitable pigtails to the first and second optical fibers of the cable or other suitable means. Consequently, if desired the craft can advantageously open the cable and access the optical connection between the first and second connectors and if reconfigure the same, for instance, the craft can connect the first and second connectors to respective equipment such as in a mobile data center.

Figure 15:
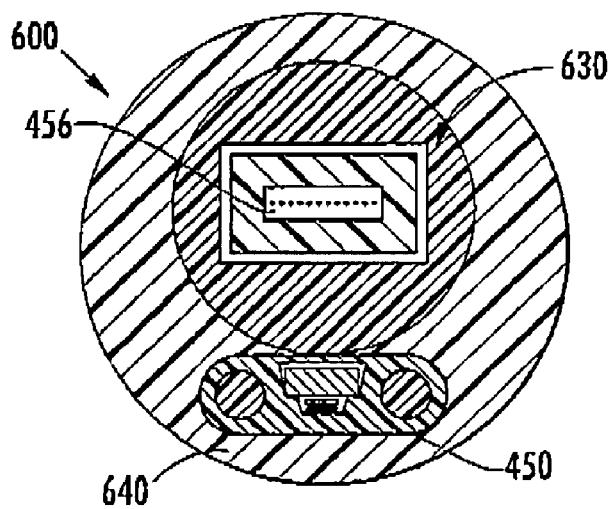
FIGS. 15 and 16 respectively are a cross-sectional view and a perspective view of a cable assembly according to the present invention.
Figure 16:
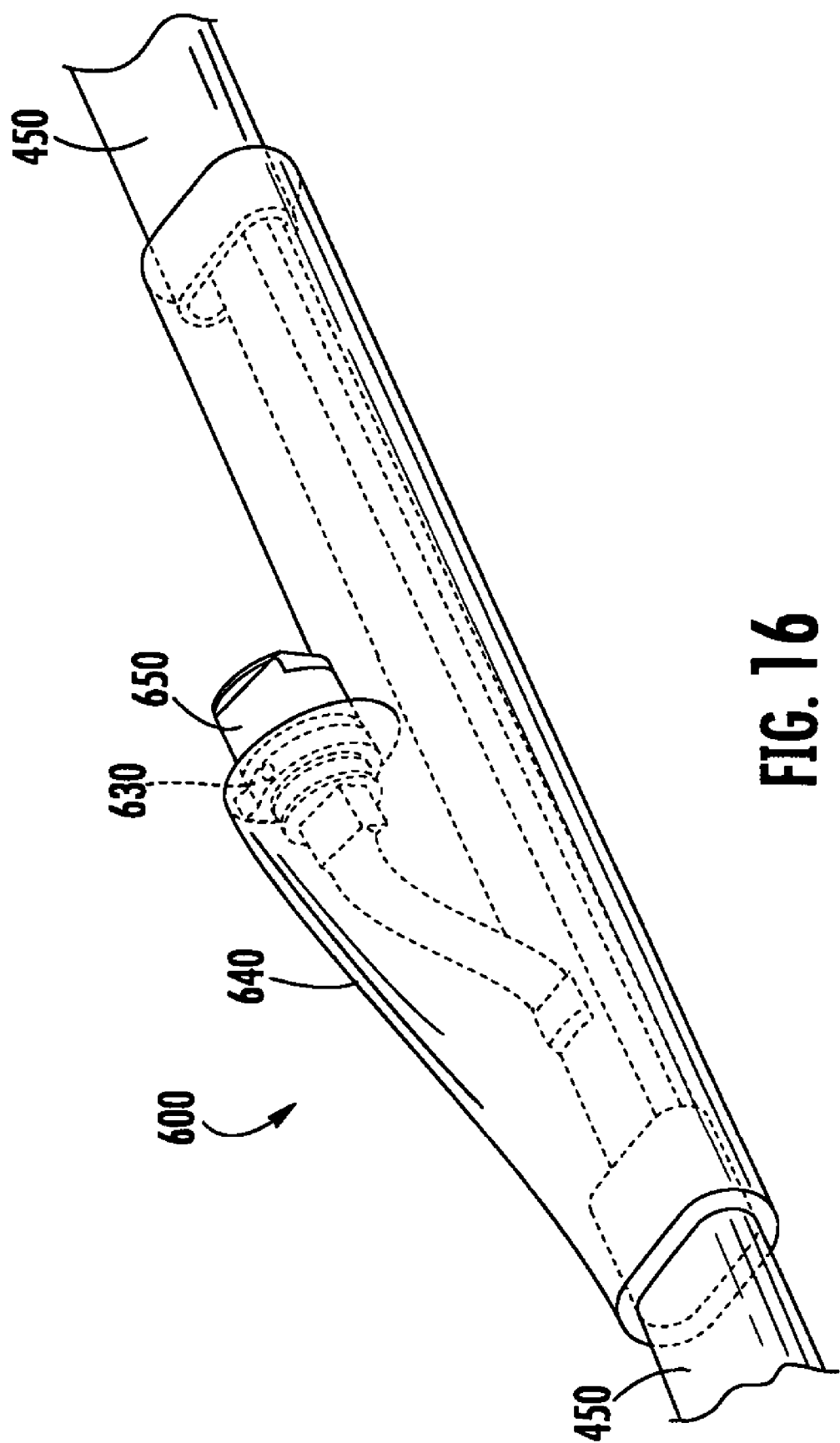

FIGS. 15 and 16 respectively illustrates a cross-sectional view and a perspective view of an explanatory cable assembly 600 that includes cable 450, a receptacle or other suitable joining point 630, and an overmold portion 640. Cable assembly 600 is advantageous because it has a relatively short overmold portion 640 since only a small portion of cable 450 is breached to access the optical fiber having an attached ferrule and/or connector (i.e. the overmold to seal the cable breach is shorter in length). Additionally, the cross-sectional footprint of cable assembly 600 due to the cable configuration and the arrangement between cable 450 and receptacle 630, thereby allowing a relatively flexible assembly. In this explanatory embodiment, cable assembly 600 routes the ferrule 456 of cable 450 to receptacle 630. As shown, this embodiment depicts twelve-fiber ribbons and a twelve-fiber ferrule; however, any suitable combination of optical fiber arrangements and/or ferrule constructions are possible. Receptacle 630 is suitable for securing ferrule 456 or connector by aligning and protecting the same. Receptacle 630 is preferably hardened and keyed and suitable for environmental sealing of the assembly. In one embodiment, receptable 630 has a threaded portion for securing the optical connection with a complimentary mating assembly such as a hardened connenctor plug such as disclosed in U.S. Pat. App. Pub. 2005/0053342 filed on Oct. 12, 2004. Receptacle 630 may also include a cap 650 that is removably attached thereto for protecting the ferrule, connector, and/or receptacle during overmolding and afterwards. Suitable receptacles are shown and described in U.S. Pat. No. 6,579,014 issued Jun. 17, 2003 entitled "Fiber Optic Receptacle" and U.S. patent application Ser. No. 10/924,525 filed Aug. 24, 2004 entitled "Fiber Optic Receptacle and Plug Assemblies," the disclosures of which are incorporated by reference herein. Other cable assemblies may have connectors or receptacles that eliminate the shroud or housing, thereby allowing a smaller cross-sectional footprint. Of course, cable assembly 600 can have multiple receptacles 630 attached along its length; moreover, cable assembly 600 may locate connectors on either or both sides of the assembly.

It will be apparent to those skilled in the art that various modifications and variations can be made to the present invention without departing from the spirit and scope of the invention. For example, the optical fibers could be packaged within buffer tubes as well as bundles, loose bare or colored optical fibers, or other suitable arrangements as known. Additionally, optical fibers could be stranded within the cable. Fiber optic cables may also include other suitable cable components and/or configurations such as armor, thixotropic filling compounds, rip cords, messenger cables, and/or other web configurations. Also variations of the structures, or modifications to same, could be combined in different ways to construct embodiments not illustrated above but still within the scope of the invention. Thus it is intended that the present invention cover the modifications and variations of this invention provided they come within the scope of the appended claims and their equivalents.

That which is claimed is:

1. A preconnectorized fiber optic cable comprising:
   at least one strength member;
   at least one optical fiber;
   at least one ferrule, the ferrule being attached to the at least one optical fiber, thereby preconnectorizing the at least one optical fiber before the cable jacket is applied and the at least one ferrule being a portion of a reconfigurable optical connection, wherein the reconfigurable optical connection includes a second ferrule attached to a second optical fiber so that the at least one optical fiber is in optical communication with the second optical fiber;
   a ferrule cover, the ferrule cover being disposed about the at least one ferrule for protecting the same; and
   a cable jacket, the cable jacket surrounding the at least one strength member, the at least one optical fiber and the at least one ferrule so that when the cable jacket is opened the at least one optical fiber having the at least one ferrule attached may be accessed.

2. The preconnectorized fiber optic cable of claim 1, further comprising an indicia on the cable jacket to identify a location of the ferrule in the fiber optic drop cable.

3. The preconnectorized fiber optic cable of claim 2, wherein the indicia is a raised portion of the cable jacket.

4. The preconnectorized fiber optic cable of claim 1, the at least one optical fiber comprises a first optical fiber and a second optical fiber and the at least one ferrule comprises a first ferrule and a second ferrule, wherein the first optical fiber is attached to the first ferrule and the second optical fiber is attached to the second ferrule.

5. The preconnectorized fiber optic cable of claim 1, wherein the at least one strength member comprises two strength members and the at least on optical fiber is disposed therebetween within a cavity.

6. The preconnectorized fiber optic cable of claim 1, further comprising at least two cavities, a first cavity having the first optical fiber and first ferrule disposed therein and a second cavity having the second optical fiber and second ferrule disposed therein.

7. The preconnectorized fiber optic cable of claim 1, further comprising a preferential tear portion in the jacket to allow access to the at least one ferrule.

8. A preconnectorized fiber optic cable having at least one ferrule disposed radially inward of a cable jacket, comprising:
   at least one optical fiber, the at least one optical fiber having the at least one ferrule attached thereto, thereby preconnectorizing the at least one optical fiber and the at least one ferrule being a portion of a reconfigurable optical connection disposed radially inward of the cable jacket, wherein the reconfigurable optical connection includes a second ferrule attached to a second optical fiber and the at least one ferrule and the second ferrule are mated together so that the at least one optical fiber is in optical communication with the second optical fiber;
   at least one cavity, the at least one cavity having an upper portion and a lower portion, wherein the upper portion is wider than the lower portion and the at least one cavity being disposed longitudinally along the preconnectorized fiber optic cable, wherein the at least one optical fiber having the at least one ferrule attached thereto is disposed within the upper portion of the at least one cavity, wherein the cable jacket generally surrounds the at least one optical fiber having the at least one ferrule attached thereto.

9. The preconnectorized fiber optic cable of claim 8, the at least one cavity having a ledge for separating the upper portion and lower portion of the at least one cavity, wherein the at least one ferrule is disposed radially outward of the ledge.

10. The preconnectorized fiber optic cable of claim 8, the at least one optical fiber being a portion of an optical fiber ribbon and the at least one ferrule being a MT ferrule.

11. The preconnectorized fiber optic cable of claim 8, the cable jacket having a preferential tear portion for aiding in accessing the at least one cavity.

12. The preconnectorized fiber optic cable of claim 8, the at least one cavity having a plurality of optical fiber ribbons, wherein at least some of the optical fibers of the plurality of optical fiber ribbons are preconnectorized with one or more ferrules.

13. The preconnectorized fiber optic cable of claim 8, further comprising a water-swellable component or a water-blocking component.

14. The preconnectorized fiber optic cable of claim 8, the at least one cavity having a plurality of optical fiber ribbons and a plurality of ferrules disposed therein, wherein some of the optical fiber ribbons have one of the plurality of ferrules preconnectorized thereto.

15. The preconnectorized fiber optic cable of claim 8, the cable jacket being flame retardant.

16. The preconnectorized fiber optic cable of claim 8, the cable having a marking indicia for identifying a location of the at least one ferrule within the preconnectorized fiber optic cable.

17. The preconnectorized fiber optic cable of claim 8, further comprising a cover for protecting the at least one ferrule.

18. A preconnectorized fiber optic cable comprising:
at least one optical fiber ribbon, the at least one optical fiber ribbon having a plurality of optical fibers;
a cable core, the cable core forming a portion of at least one cavity disposed longitudinally along the cable core, wherein the cavity has a stepped profile with a wider portion radially outward of a narrower portion and the at least one optical fiber ribbon is disposed within the at least one cavity;
a multifiber ferrule, the multifiber ferrule being attached to the at least one of the optical fibers off the at least one optical fiber ribbon and being disposed within the cavity, thereby preconnectorizing the at least one optical fiber and the multifiber ferrule being a portion of a reconfigurable optical connection disposed radially inward of the cable jacket, wherein the reconfigurable optical connection includes a second multifiber ferrule attached to a second optical fiber and the multifiber ferrule and the second multifiber ferrule being mated together so that at least one of the optical fibers of the at least one optical fiber ribbon is in optical communication with the second optical fiber; and
a cable jacket, the cable jacket surrounding at least a portion of the cable core so that when the cable jacket is opened the multifiber ferrule having one of the optical fibers of the at least one optical fiber ribbon may be accessed.

19. The preconnectorized fiber optic cable of claim 18, the cable jacket having a preferential tear portion for accessing the at least one cavity.

20. The preconnectorized fiber optic cable of claim 18, further comprising a water-swellable component or water-blocking component.

21. The preconnectorized fiber optic cable of claim 18, the at least one cavity having a plurality of optical fiber ribbons and a plurality of ferrules, wherein some of the optical fiber ribbons have one of the plurality of ferrules preconnectorized thereto.

22. The preconnectorized fiber optic cable of claim 18, the cable jacket being flame retardant.

23. The preconnectorized fiber optic cable of claim 18, the cable having a marking indicia for identifying a location of the ferrule within the fiber optic cable.

24. A method of manufacturing, a preconnectorized fiber optic cable comprising the steps of:
providing a first optical fiber;
providing a first ferrule;
attaching the first ferrule to the first optical fiber before the cable jacket is applied to the preconnectorized fiber optic cable;
placing the first ferrule at a predetermined location of a cavity that is disposed along a length of the cable, wherein the cavity has an upper portion and a lower portion with the upper portion being wider than the lower portion and the first ferrule is disposed in the upper portion of the cavity;
providing a second ferrule;
providing a second optical fiber;
attaching the second optical fiber to the second ferrule;
mating the first ferrule with the second ferrule so that the first optical fiber is in optical communication with the second optical fiber within the fiber optic cable; and
applying a cable jacket so that it surrounds the first ferrule attached to the first optical fiber and the second ferrule attached to the second optical fiber.

25. The method of claim 24, further comprising the step of providing at least one strength member before applying the cable jacket.

26. The method of claim 24, further comprising the step of placing a cover on the first ferrule.

* * * * *